United States Patent
Qi et al.

(10) Patent No.: US 10,368,410 B2
(45) Date of Patent: Jul. 30, 2019

(54) PWM CONTROL FOR LEDS WITH REDUCED FLICKER WHEN USING SPREAD SPECTRUM SWITCHING FREQUENCIES

(71) Applicant: Linear Technology Corporation, Milpitas, CA (US)

(72) Inventors: Xin Qi, Cary, NC (US); Eric S. Young, Apex, NC (US); Keith D. Szolusha, Saratoga, CA (US)

(73) Assignee: Linear Technology Corporation, Milpitas, CA (US)

( * ) Notice: Subject to any disclaimer, the term of this patent is extended or adjusted under 35 U.S.C. 154(b) by 1171 days.

(21) Appl. No.: 13/656,559

(22) Filed: Oct. 19, 2012

(65) Prior Publication Data
US 2014/0111110 A1 Apr. 24, 2014

(51) Int. Cl.
*H05B 33/00* (2006.01)
*H05B 33/08* (2006.01)

(52) U.S. Cl.
CPC ..... *H05B 33/0845* (2013.01); *H05B 33/0818* (2013.01); *Y02B 20/347* (2013.01)

(58) Field of Classification Search
CPC ............ H05B 33/0815; H05B 33/0818; H05B 33/0845; H05B 33/086; H05B 33/0869; H05B 33/0872; H05B 37/02; H05B 41/2825
USPC ........ 315/200 R, 209 R, 224, 246, 247, 294, 315/307, 308, 312, 77; 363/21.09–21.17, 363/97
See application file for complete search history.

(56) References Cited

U.S. PATENT DOCUMENTS

| | | | |
|---|---|---|---|
| 7,321,203 B2 * | 1/2008 | Marosek | ....................... 315/247 |
| 2007/0210725 A1 | 9/2007 | Marosek | |
| 2010/0033110 A1 | 2/2010 | Chien | |
| 2012/0250367 A1 * | 10/2012 | Desimone et al. | ........ 363/21.17 |

OTHER PUBLICATIONS

Extended European Search Report for EP counterpart application 13 186 476.1 dated Jan. 20, 2014, 4 pages.

* cited by examiner

*Primary Examiner* — Monica C King
(74) *Attorney, Agent, or Firm* — Patent Law Group LLP; Brian D. Ogonowsky (57) ABSTRACT

A technique to eliminate perceptible flickering by LEDs being dimmed by PWM pulses is disclosed. A controllable oscillator controls a switching frequency of a converter for supplying a regulated current or regulated voltage. The converter controls a first switch at a switching frequency. A varying second signal level is generated by a spread spectrum control (SSC) circuit for controlling the oscillator to vary the switching frequency during operation. A PWM dimming circuit generates a string of PWM pulses that control a switch in series with the LEDs. The SSC circuit is synchronized with the PWM pulses to generate the same second signal level at a start of each PWM pulse, such that the switching frequency of the converter is forced to be substantially the same at the start of each PWM pulse while the pulse widths are constant. The repeating driving current waveform eliminates perceptible flicker by the LEDs.

22 Claims, 5 Drawing Sheets

PWM CONTROL FOR LEDS WITH REDUCED FLICKER WHEN USING SPREAD SPECTRUM SWITCHING FREQUENCIES

FIELD OF THE INVENTION

This invention relates to controlling the dimming of light emitting diodes (LEDs) using pulse width modulation (PWM) and, in particular, to a technique for reducing flicker of the LEDs when controlling switching of a switch mode regulator using spread spectrum frequencies.

BACKGROUND

Figure 1:
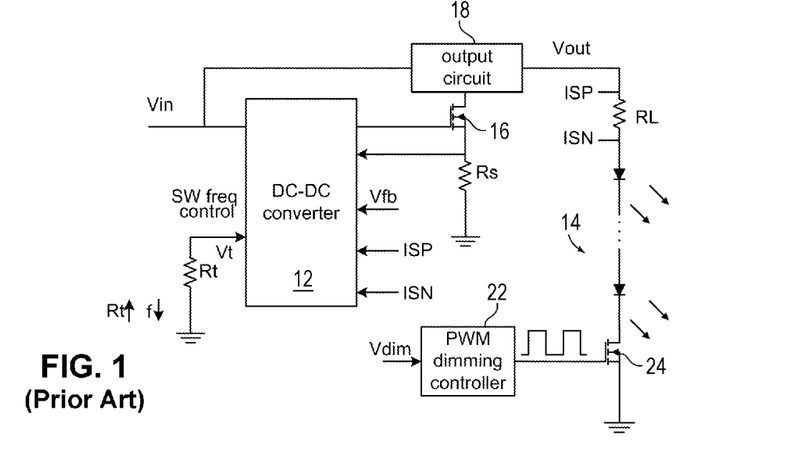
FIG. 1 illustrates a conventional DC-DC converter operating independently of a PWM dimming controller for LEDs.

FIG. 1 illustrates a known type of system for driving and dimming LEDs. Many different types of systems are known.

A conventional DC-DC converter 12 receives an input voltage Vin. The converter 12 typically boosts the voltage to slightly above the combined forward voltages of the series connection of LEDs 14, such as 40 volts, in order to cause a predetermined regulated current to flow through the LEDs 14. Any type of converter may be used, such as a flyback converter. Other types of converters, such as buck converters, may be used depending on the relationship between the input voltage and the required driving voltage.

The converter 12 adjusts the duty cycle of the MOSFET 16 (or other type of switch) so as to supply the desired current through the LEDs. The duty cycle, for a current mode converter, is set by the converter regulating the peak switch current per switching cycle. The peak current is determined by the voltage across the resistor Rs.

The value of the resistor RL in series with the LEDs 14 may be selected to set the LED current level, when current flows through the LEDs 14, or a separate current control signal may be applied to an input terminal of the converter 12 to set the current level.

The converter 12 may instead be controlled to output a regulated output voltage Vout by applying a feedback voltage Vfb (a divided Vout) to an internal error amplifier, where the duty cycle of the MOSFET 16 is controlled to cause Vfb to match a reference voltage.

An output circuit 18 typically comprises a diode, and inductor, and a capacitor, where the configuration determines the type of converter 12, such as flyback. A synchronous rectifier may be used instead of a diode.

The converter 12 typically has various other features that prevent over-voltages and over-currents from occurring.

The converter 12 contains an oscillator that may have a fixed frequency or an adjustable frequency. In the example of FIG. 1, the frequency of the oscillator is set by an external resistor Rt value. A fixed current flows through the resistor Rt, and the resulting voltage Vt sets the oscillator frequency. Increasing the resistor Rt value increases Vt and the switching frequency.

Therefore, the converter 12 and its related components set a fixed current or fixed voltage for driving the LEDs 14. In order to control the dimming of the LEDs 14, an external PWM dimming controller 22 is supplied that controls the switching of a series MOSFET 24. An external control signal Vdim, which may be a voltage, a current, a resistance, or other variable signal, controls the duty cycle of the pulses output from the controller 22. The duty cycle controls the average current even though the LEDs 14. The controller 22 typically has a fixed switching frequency, such as 100 Hz, that is high enough to avoid perceptible flicker by the LEDs 14 turning on and off. The percentage of time that the LEDs 14 are on determines the perceived brightness. The controller 22 operation is independent from the converter's switching of the MOSFET 16.

Due to the high switching frequencies of the converter's MOSFET 16, such as 100 KHz-5 MHz, and the resulting signals conducted by the inductor and capacitor in the output circuit 18, some electromagnetic interference (EMI) may be generated by the components. To spread the RF power, it is known to continuously vary the switching frequency over a range. This technique is referred to as spread spectrum frequency modulation (SSFM).

Figure 2:
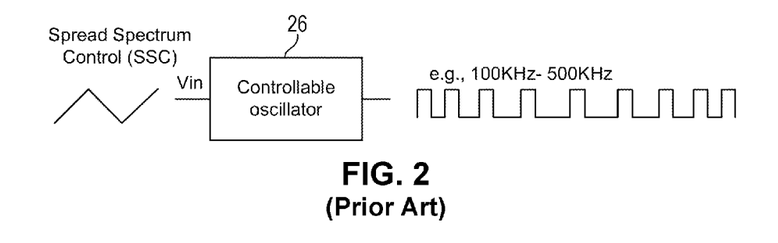
FIG. 2 illustrates a conventional controllable oscillator being controlled by a ramping spread spectrum control (SSC) signal.

FIG. 2 illustrates how a controllable oscillator 26 in the converter 12 may be controlled with a ramping spread spectrum control (SSC) signal applied to an external pin to continuously vary the switching frequency of the MOSFET 16. In the example of the converter 12 of FIG. 1, the SSC signal may modulate the voltage Vt to cause the switching frequency to vary from the base frequency set by resistor Rt.

However, the present inventors have discovered that, due to the SSFM, noticeable LED flicker occurs. There is ringing and ripple in Vout caused by the converter's switching and the interaction of the inductor and capacitor in the output circuit 18. The phase of the ringing and ripple is directly related to the phase of the converter's internal oscillator. Additionally, the switching of the LED dimming MOSFET 24 causes a surge of current to flow through the LEDs 14, which briefly lowers Vout at the beginning of a PWM dimming pulse. When using SSFM, the characteristics of Vout are thus continually changing with the switching frequency and direction of the frequency ramp, including the speed at which the converter 14 corrects for a changing load current. For example, a slower switching frequency results in a slightly longer time for the peak current through the MOSFET 16 to be corrected for changes in load current. Additionally, the converter may go into a discontinuous mode as some slower frequencies but stay in a continuous mode at higher frequencies. Therefore, as the switching frequency changes, the speed that the converter 12 recovers from the surge of current changes, and the ripple and ringing change. For these various reasons, as the converter's 14 switching speed changes, the current waveform through the LEDs 14 near the beginning of each LED PWM pulse is different for each LED PWM pulse. This variation from pulse to pulse is perceptible to the observer as flicker, even though the LEDs 14 may be pulsed at about 100 Hz.

Figure 3:
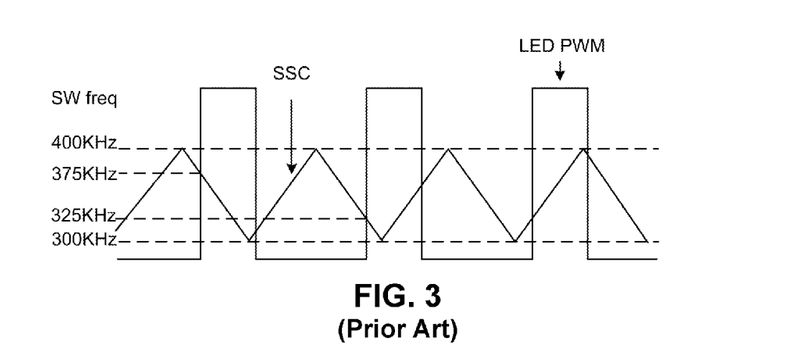
FIG. 3 illustrates an example of how the SSC signal is independent of the PWM dimming signal for the LEDs, resulting in different LED driving current waveforms during each PWM pulse, causing perceptible flicker.

FIG. 3 illustrates the independence of the switching frequency of an SSFM converter (ramping between 300 KHz to 400 KHz) and the occurrence of the LED PWM pulses. In other words, the period of the spread spectrum control (SSC) ramp is different from the period of the LED PFM pulses. Note how the switching frequency is different at the start of each LED PWM pulse, such as 375 KHz, 325 KHz, etc. This causes perceptible flicker. In FIG. 3, it is assumed that a rising ramp increases the switching frequency, but in other types of systems a rising ramp decreases the switching frequency.

What is needed is a technique that allows for SSFM control of a switching regulator and PWM dimming control of LEDs without any resulting perceptible flicker.

SUMMARY

A switching converter LED drive circuit using SSFM is disclosed that has controllable dimming.

The inventors have determined that, as long as the ringing/ripple/droop of the current-driving waveform is substantially identical during each PWM dimming pulse, the same small brightness perturbations occur during each LED switching cycle (when the series MOSFET is on), and the repetitive nature of these perturbations do not result in perceptible flicker to the human observer.

The same brightness perturbations during each LED switching cycle, when using a SSFM converter for driving the LEDs, are achieved by synchronizing the PWM dimming signal with the spread spectrum control (SSC) signal. In one embodiment, the falling edge of the PWM pulse for dimming the LEDs resets the SSC ramp to its lowest level, and the SSC ramp begins to increase starting at the leading edge of the next PWM pulse. If the PWM pulses are constant (i.e., the dimming level stays constant), the SSC ramp will be the same for each PWM pulse. Since the level of the SSC ramp determines the converter switching frequency, the converter switching frequency will be substantially identical for each PWM pulse. Accordingly, when the LEDs turn on at the beginning of each PWM pulse, the same converter characteristics will exist, so any perturbations in brightness (e.g., ringing, ripple, Vout droop) when the LEDs turn on, and throughout the width of the pulse, will be identical from pulse to pulse. This repetitive action will produce no perceivable flicker.

In another embodiment, the SSC ramp is controlled to change directions at both the leading edge of the PWM pulse and falling edge of the PWM pulse.

In another embodiment, the SSFM is controlled by a dithering circuit that generates a repeatable pseudo-random series of pulses having different levels. The pulses cause the converter's oscillator to randomly change frequencies to reduce EMI. This is also known as frequency hopping. The pseudo-randomness is controlled by an algorithm or state machine in the dithering circuit. The dithering algorithm or state machine is reset at the falling edge of each PWM pulse, so the series of pulses output by the dithering circuit is identical starting at the beginning of each PWM pulse to cause the repetitive action per PWM pulse to produce no perceivable flicker.

Various other embodiments are described.

BRIEF DESCRIPTION OF THE DRAWINGS

Elements that are the same or equivalent are labeled with the same numeral.

DETAILED DESCRIPTION

Figure 4:
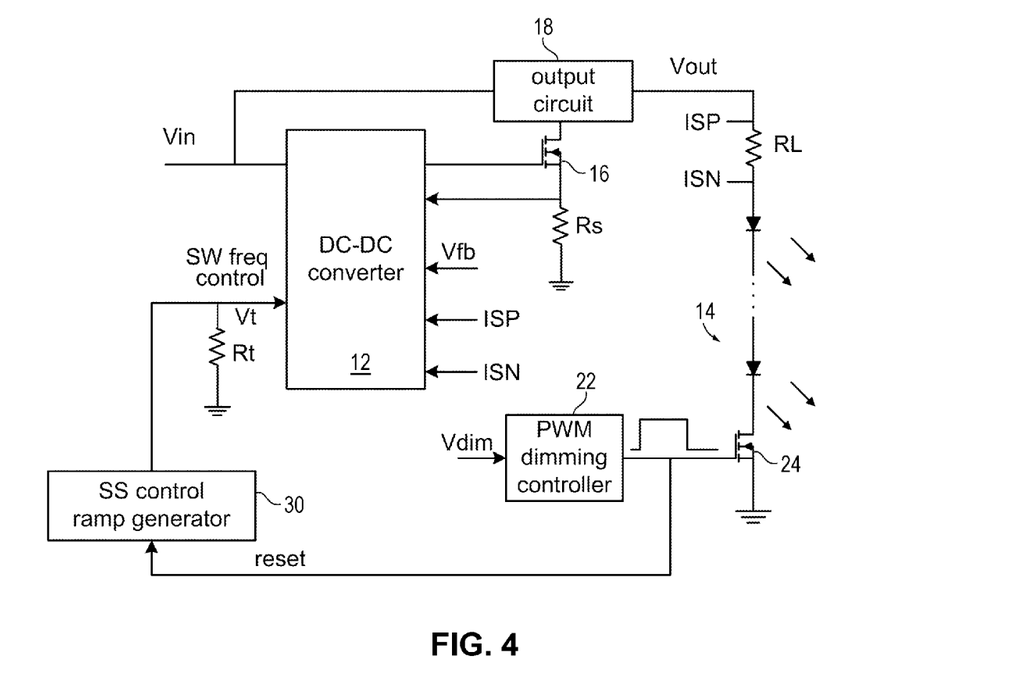
FIG. 4 illustrates a converter and PWM dimming controller in accordance with one embodiment of the invention, where the SSC signal is synchronized with the PWM pulse train to cause the LED driving current waveform during each PWM pulse to be substantially identical, eliminating perceptible flicker.

FIG. 4 illustrates the conventional system of FIG. 1, but where the SSC signal is synchronized with the PWM pulses for dimming the LEDs 14. The circuit may be referred to as an LED driver using SSFM with controllable dimming.

The converter 12 contains a conventional controllable oscillator, such as shown in FIG. 2, whose frequency varies with a varying input voltage. In another embodiment, the frequency may be changed under the control of any varying signal such as a current. The converter 12 may generate a regulated current or a regulated voltage.

A SSC ramp generator 30 generates a ramping signal. The ramping signal may be self-oscillating, but is resettable to a starting level by a reset signal. For example, the ramp generator may comprise a capacitor that is charged with a fixed current source to generate a ramping up voltage until the voltage reaches a limit. The current source may be internal to the converter 12. When the upper limit is reached, such as by being detected using a comparator comparing the ramp level to a fixed threshold voltage, the capacitor is discharged by a current source or a resistance until the capacitor voltage reaches a lower limit. The process then repeats. In this way, the ramping voltage oscillates between two limits. The ramping up and ramping down may also be initiated by an external signal to override or replace the limit-detecting comparators. The ramping voltage may then be used to control the conductivity of a transistor to draw a ramping current. The switching oscillator internal to the converter 12 may be controlled using either voltage control or current control.

In another embodiment, the SSC ramp generator 30 may charge a capacitor with a current source to generate a ramping voltage, then quickly discharge the capacitor to reset it to zero voltage, such as by applying a low resistance across it. The resetting may occur automatically after the capacitor reaches an upper limit and may also be due to an external reset signal. For example, the zero voltage may remain until the leading edge of a PWM pulse, at which time the capacitor is charged, and the capacitor may be discharged at the falling edge of the PWM pulse.

Many other types of SSC ramp generators may be used.

The output of the PWM dimming controller 22 is connected to an input of the SSC ramp generator 30 to cause the upward ramping to be reset to a starting level at the falling edge of the PWM pulse. The output of the SSC ramp generator 30 is connected to control the frequency of the controllable oscillator in the converter 12.

In the example using the particular converter 12 of FIG. 4, the converter 12 internally generates a fixed current that flows through a frequency setting resistor Rt. A higher Rt value creates a higher voltage Vt applied to the internal controllable oscillator, which increases the switching frequency of the converter 12. The SSC ramp generator 30 is effectively connected in parallel with the resistor Rt to vary Vt. As the SSC ramp generator 30 draws an upwardly ramping current, Vt is reduced, causing the switching frequency to be reduced. Conversely, as the SSC ramp generator 30 draws a downwardly ramping current, Vt is increased, causing the switching frequency to be increased.

Upon the SSC ramp generator 30 detecting the falling edge of the PWM signal, the SSC ramp generator current is reset to the same starting level and remains at the starting level until it is triggered by the leading edge of the next PWM pulse. The SSC signal ramps up (or down) at the same rate during the PWM pulses. Therefore, the current waveform that flows through the LEDs 14 during the length of each PWM pulse is substantially the same from pulse to pulse, and the repetitive nature results in no perceptible flickering of the LEDs 14.

The resetting to the starting level may be any level within the ramping range, as long as the starting level is the same at the start of each pulse and the SSC signal repeats from pulse to pulse.

In another embodiment, the SSC signal may ramp between the PWM pulses as long as it is reset at the same point for each pulse.

In other embodiments, the output of the SSC ramp generator 30 may be a ramping voltage signal, such as a signal supplying the Vt control signal to the controllable oscillator in the converter 12. There is no requirement for the resistor Rt.

Accordingly, the SSC signal (of any type) is synchronized with the PWM pulse train to cause the switching frequencies (and driving current waveform) during each PWM pulse to be substantially identical, eliminating perceptible flicker.

Figure 5:
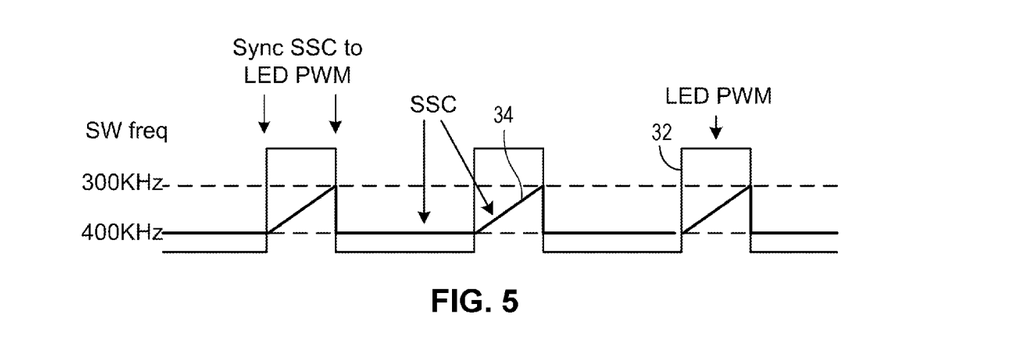
FIG. 5 illustrates how the SSC signal is reset by the falling edge of each PWM pulse so that the switching frequency of the converter is the same at the start of each PWM pulse and varies in the same manner through each pulse, thereby eliminating perceptible flicker. The direction of the ramps may be reversed in all embodiments.

FIG. 5 illustrates how the SSC ramp generator 30 signal is reset by the falling edge of each PWM pulse so that the switching frequency of the converter is the same at the start of each PWM pulse and varies in the same manner through each pulse, thereby eliminating perceptible flicker. The PWM pulses 32 and SSC ramp generator signal 34 are shown. The SSC ramp generator signal 34 may be a current or voltage signal, depending on the particular application. In the example of FIG. 4, the signal 34 represents the amount of current drawn from the resistor Rt terminal so that an increasing current lowers the switching frequency. In other types of circuits, the signal 34 may represent a voltage that increases the switching frequency when rising.

Figure 6:
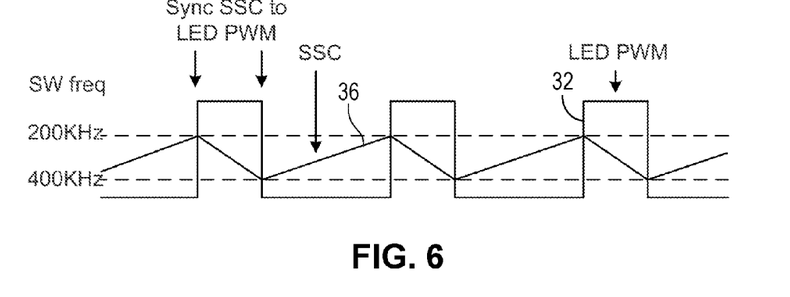
FIG. 6 illustrates another embodiment of the invention where a certain type of PWM control circuit for the LEDs is used to create the SSC ramp, resulting in the SSC ramp changing direction at the leading edge of the PWM pulse and being reset at the falling edge of the PWM pulse.

FIG. 6 illustrates another embodiment of the invention where a certain type of self-oscillating PWM-generating circuit for the LEDs is used to create the SSC ramp 36, resulting in the SSC ramp changing direction at the leading edge of the PWM pulse 32 and being reset at the falling edge of the PWM pulse. The reset value is always the same. Increasing the pulse width increases the range of the SSC ramp 36 that occurs within the pulse time. The pulses 32 all experience the same switching frequencies throughout the pulse, assuming the dimming is not changed, resulting in no perceptible flicker. As described later, the circuit of FIG. 10 may be used to create the waveforms of FIG. 6.

Figure 7:
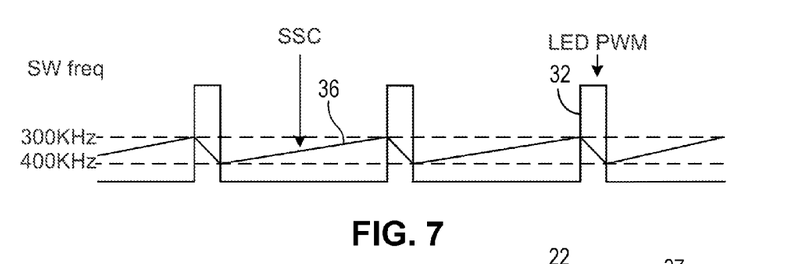
FIG. 7 illustrates the embodiment of FIG. 6 where the duty cycle of the PWM pulse is reduced, causing the range of the SSC signal to be reduced.

FIG. 7 illustrates the embodiment of FIG. 6 where the duty cycle of the PWM pulses 32 is reduced to dim the LEDs 14, causing the range of the SSC signal 36 to be reduced during the length of the pulses. This reduces the range of the switching frequencies, which slightly increases EMI.

Figure 8:
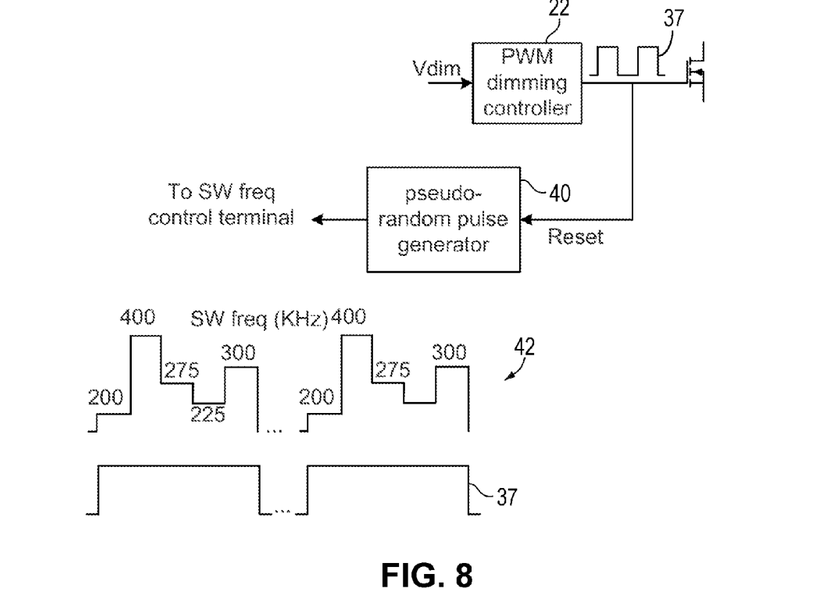
FIG. 8 illustrates another embodiment of the invention where the falling edge of the PWM pulse resets a pseudo-random dithering circuit (for frequency hopping) to cause each PWM pulse to be substantially identical, eliminating perceptible flicker.

FIG. 8 illustrates another embodiment of the invention where the falling edge of the PWM pulse 37 resets a pseudo-random pulse generator 40, which is a dithering circuit for frequency hopping, to cause the driving current waveform for each PWM pulse to be substantially identical, eliminating perceptible flicker. In the example of FIG. 8, various pseudo-random pulse levels 42 are output by the generator 40 in a particular repetitive order for each PWM pulse. There may be thousands of pseudo-random pulses 42 per PWM pulse. Upon being reset, the sequence of pulses 42 repeats so the switching frequencies during each PWM pulse are repeated from PWM pulse to PWM pulse.

Figure 9:
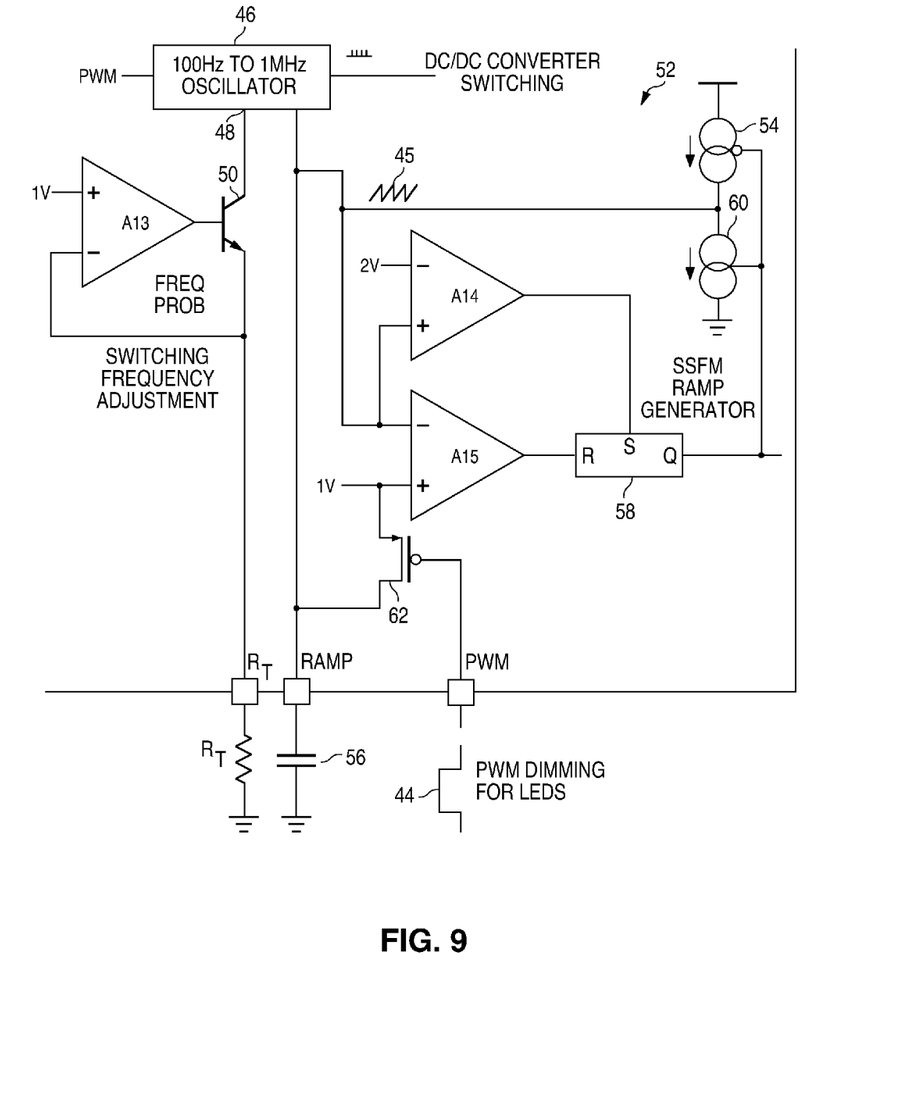
FIG. 9 illustrates one type of circuit where the PWM pulses cause the ramping SSC signal to be reset at the falling edge of each PWM pulse to generate waveforms similar to those of FIG. 5.

FIG. 9 illustrates one type of circuit in a DC-DC converter IC package where the PWM pulses 44 cause the ramping SSC signal 45 to be reset at the falling edge of each PWM pulse 44. In one embodiment, a controllable oscillator 46 has a first input 48, where the amount of current drawn sets a base frequency. A unity buffer A13 controls a transistor 50 to conduct whatever current is needed to drop 1 volt across the frequency setting resistor Rt. Therefore, the value of the resistor Rt is selected by the user to create the desired base switching frequency of the converter. That portion of the circuit may be prior art and within the DC-DC converter 12 of FIG. 4, formed as an integrated circuit. To cause the oscillator 46 to have SSFM and for the SSFM to be synchronized with the PWM dimming pulses, the circuit 52 is added. The circuit 52 operates as a spread spectrum control (SSC) ramp generator and may be located within the DC-DC converter 12 IC of FIG. 4.

A current source 54 charges a capacitor 56 at a constant current when the output Q of an RS flip-flop 58 is 0 (its reset state). The capacitor 56 creates an upward ramping voltage. When the voltage equals 2 volts, a comparator A14 is triggered, since its other input has a fixed 2 volts applied to it. The logic 1 output of the comparator A14 sets the flip-flop 58 to cause the output Q to go high. This turns off the current source 54 and turns on a current source 60. Current source 60 then draws a constant current from the capacitor 56 to create a downward ramping voltage. When the voltage equals 1 volt, a comparator A15 is triggered, since its other input has a fixed 1 volt applied to it. The logic 1 output of the comparator A15 resets the flip-flop 58 to cause the output Q to go low. The self-oscillating process then continues. In one example, the value of the capacitor 56 is selected to cause the ramp to oscillate at 200 Hz. The ramping voltage is applied to an input of the controllable oscillator 46 to vary its frequency proportional to the ramping voltage. The ramping frequency may start from the bottom frequency set by the resistor Rt. For example, the controllable oscillator 46 frequency may vary between 200 KHz to 500 KHz. In another embodiment, the resistor Rt may set the upper switching frequency.

To cause the ramping waveform to be synchronized to the PWM dimming pulses, the falling edge of each PWM pulse 44 turns on a PMOS transistor 62 connected between the 1 volt source and the capacitor 56. Accordingly, at the falling edge of the pulse 44, the capacitor voltage is forced to 1 volt, which triggers the comparator A15 to cause the current source 54 to start charging the capacitor 56. In this way, assuming the PWM pulse duty cycle has not changed, the ramping voltage level will be the same at the start of each PWM pulse and the switching frequencies of the converter will be substantially identical during each PWM pulse. Therefore, there will be no perceptible flicker of the LEDs 14.

Figure 10:
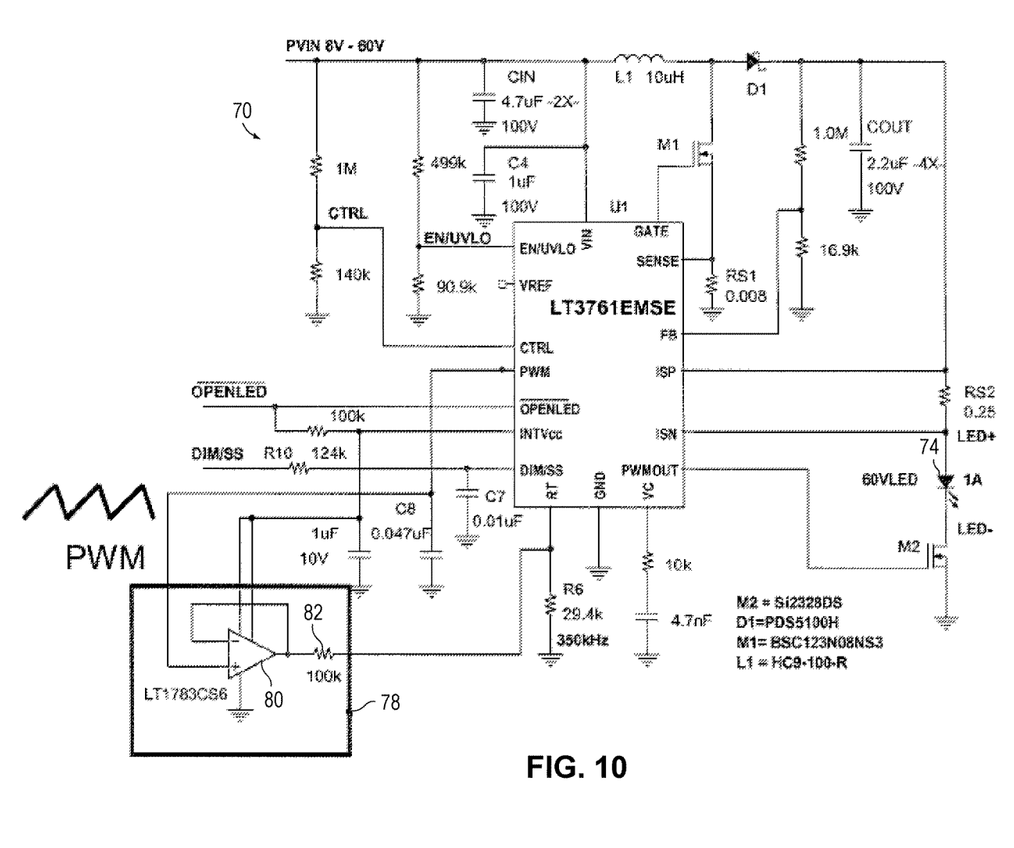
FIG. 10 illustrates another type of circuit where a self-oscillating PWM control waveform is used to generate a ramping SSC signal so that the SSC signal changes directions at the rising and falling edges of the pulse to generate waveforms similar to those of FIGS. 6 and 7.

FIG. 10 illustrates another type of circuit where a self-oscillating PWM generating circuit causes the ramping SSC signal to change directions at the rising and falling edges of the PWM pulse to generate waveforms similar to those of FIGS. 6 and 7. The circuit of FIG. 10 uses the LT3761EMSE LED Controller With Internal PWM Generation (hereinafter, the LT3761). The datasheet for this part is available on-line from the Linear Technology Corporation website and is incorporated herein by reference. The circuit also uses an LT1783CS6 op amp.

The external circuitry 70 that sets up DC inputs and provides the output circuit for the DC-DC converter portion of the circuit is conventional and need not be described. The converter's operation is the same as described with respect to FIG. 1.

The LT3761 has a PWM pin which can be driven by an external digital signal to cause the PWMOUT pin to drive the PWM switching MOSFET M2 at a desired frequency and duty cycle. Instead of driving the PWM pin with an external signal, a capacitor C8 is connected to the PWM pin, and internal pull-up and pull-down current sources are used to charge and discharge the capacitor C8 between two voltages. The value of the capacitor C8 sets the PWM pulse frequency. The magnitudes of the two currents are set by the DIM/SS signal to control the duty cycle (dimming) of the LED 74. This is described in the datasheet.

The switching frequency of the internal oscillator is set by the resistor R6 (same as Rt in FIG. 1) connected to the RT pin of the LT3761, as described with respect to FIG. 1.

The present invention is applied to the known circuit as follows to synchronize the PWM dimming pulses with the switching frequency to eliminate perceptible flicker of the LED 74.

The voltage at the capacitor C8 ramps up and down at a certain frequency, which is inherently synchronized to the PWMOUT signal controlling the MOSFET M2. The circuit 78 creates a spread spectrum control (SSC) ramping signal, using the capacitor C8 ramping voltage, and applies the SSC ramping signal to the RT input of the LT3761 so that the converter's switching frequencies are the same during each PWM pulse, eliminating perceptible flicker. The ramping capacitor C8 voltage is applied to an input of an op amp 80 connected as a unity gain buffer. A resistor 82 scales the ramping output of the op amp 80, and the scaled output is applied to the RT pin to vary the switching frequency of the converter. A bottom frequency, such as 350 KHz is set by the resistor R6. Accordingly, the SSC ramp frequency is directly tied to the PWM pulse frequency and have the same phase.

The resulting SSC signal and PWM pulses may be those shown in FIGS. 6 and 7, where the SSC signal always ramps down to the same starting level during the PWM pulse. In the examples of FIGS. 6 and 7, the starting frequency at the falling edge of a PWM pulse is always 400 KHz. The switching frequency at the beginning of a PWM pulse varies depending on the duty cycle, but will be the same from pulse to pulse when the duty cycle is constant.

Many other techniques may be used to implement the present invention and such techniques will depend on the particular application and LED driver circuits used.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A light emitting diode (LED) driver comprising:
   a PWM dimming circuit for receiving a dimming control signal, wherein the dimming circuit outputs a string of PWM pulses having pulse widths corresponding to the perceived brightness of at least one LED, where the PWM pulses control a first switch in series with the at least one LED using pulse width modulation;
   a switching converter for supplying a regulated current or regulated voltage, the converter controlling at least a second switch at a switching frequency to supply the regulated current or regulated voltage to the at least one LED, the converter comprising a first oscillator for generating a first signal that controls the switching frequency;
   a spread spectrum control (SSC) circuit configured to generate a varying second signal level, the varying second signal level being coupled to the first oscillator to control the first oscillator to vary the switching frequency during operation of the converter; and
   a synchronizing circuit coupled to the SSC circuit for controlling the SSC circuit to generate substantially the same second signal level at a start of each PWM pulse in the string of PWM pulses while the pulse widths are constant, such that the switching frequency of the converter is forced to be substantially the same at the start of each PWM pulse while the pulse widths are constant.

2. The driver of claim 1 wherein the SSC circuit is a ramp generator.

3. The driver of claim 2 wherein the SSC circuit is reset to a starting ramp level by a falling edge of each PWM pulse.

4. The driver of claim 2 wherein the SSC circuit is reset to a starting ramp level by a leading edge of each PWM pulse.

5. The driver of claim 1 wherein the SSC circuit is a dither circuit outputting pseudo-random signal levels having a repeatable sequence starting from a first level.

6. The driver of claim 5 wherein the dither circuit is reset to the first level by a falling edge of each PWM pulse.

7. The driver of claim 5 wherein the dither circuit is reset to the first level by a leading edge of each PWM pulse.

8. The driver of claim 1 wherein at least one edge of each PWM pulse causes the SSC circuit to output the same second signal level at a start of each PWM pulse in the string of PWM pulses.

9. The driver of claim 1 wherein the PWM dimming circuit comprises a self-oscillating circuit for setting a frequency of the PWM pulses, the self-oscillating circuit generating an oscillating third signal, wherein the SSC circuit derives the second signal from the third signal such that the level of the second signal is substantially the same at an edge of each of the PWM pulses.

10. The driver of claim 1 wherein controlling the SSC circuit to generate substantially the same second signal level at the start of each PWM pulse causes the regulated voltage or regulated current output of the converter to have characteristics at the start of each PWM pulse that are substantially the same from pulse to pulse.

11. A light emitting diode (LED) driver comprising:
    a pulse width modulation (PWM) dimming device for controlling a perceived brightness of at least one LED by controlling widths of PWM pulses at a first frequency;

a switching converter for supplying a current or voltage to the at least one LED, the converter switching at a switching frequency different from the first frequency;

a spread spectrum control (SSC) device for varying the switching frequency during operation of the converter; and a synchronizing device for forcing the switching frequency of the converter to be substantially the same at the start of each PWM pulse while the pulse widths are constant.

12. The driver of claim 11 wherein the first frequency is constant.

13. The driver of claim 11 wherein the PWM pulses control a first switch in series with the at least one LED using pulse width modulation.

14. The driver of claim 11 wherein the PWM dimming device, the SSC device, and the synchronizing device are all circuits.

15. The driver of claim 11 wherein the switching converter includes a first oscillator and wherein the SSC device generates a varying signal to control the first oscillator to vary the switching frequency during operation of the converter.

16. The driver of claim 11 wherein the SSC device comprises a ramp generator.

17. The driver of claim 16 wherein the SSC device is reset to a starting ramp level by one of a falling edge of each PWM pulse and a leading edge of each PWM pulse.

18. The driver of claim 11 wherein the SSC device outputs pseudo-random signal levels having a repeatable sequence.

19. The driver of claim 11 wherein at least one edge of each PWM pulse causes the SSC device to output the same signal level at a start of each PWM pulse.

20. The driver of claim 11 wherein the PWM dimming device comprises a self-oscillating device for setting a frequency of the PWM pulses, the self-oscillating device generating an oscillating signal.

21. The driver of claim 11 wherein the SSC device causes the voltage or current output of the converter to have characteristics at the start of each PWM pulse that are substantially the same from pulse to pulse.

22. A light emitting diode (LED) driver comprising:

a means for controlling a perceived brightness of at least one LED by controlling widths of pulse width modulation (PWM) pulses at a first frequency;

a means for switching for supplying a current or voltage to the at least one LED, the means for switching having a switching frequency different from the first frequency;

a means for varying the switching frequency during operation of the converter; and a means for forcing the switching frequency of the means for switching to be substantially the same at the start of each PWM pulse while the pulse widths are constant.

* * * * *